June 20, 1950 E. W. SEEGER ET AL 2,512,000
CONTROL FOR ALTERNATING CURRENT MOTORS
Filed Nov. 6, 1946 2 Sheets-Sheet 1

Fig. 1

Inventors
Norbert L. Schmitz
Edwin W. Seeger
By Frank H. Hubbard
Attorney

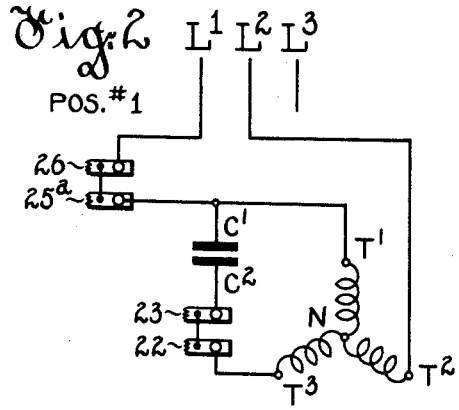
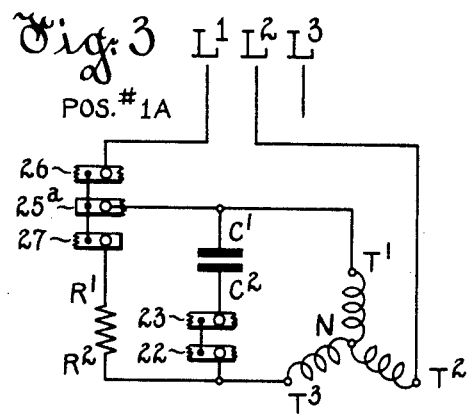
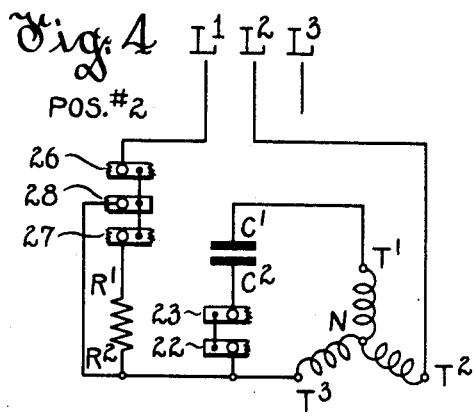
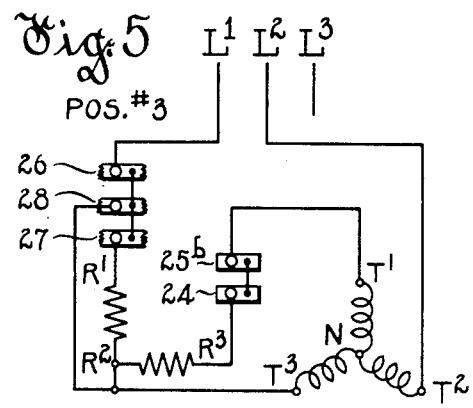
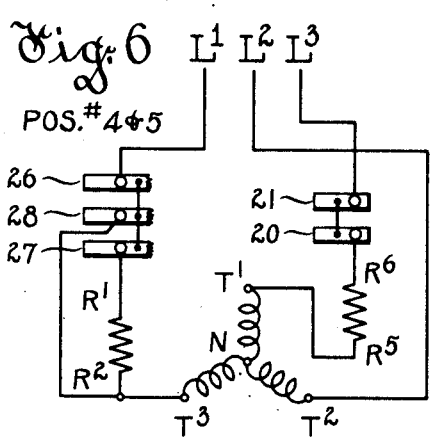
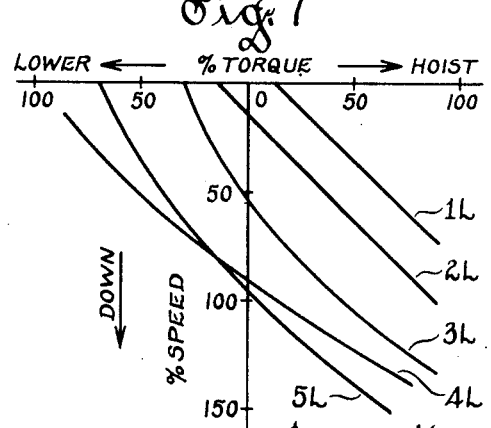

Patented June 20, 1950

2,512,000

UNITED STATES PATENT OFFICE 2,512,000

CONTROL FOR ALTERNATING CURRENT MOTORS

Edwin W. Seeger and Norbert L. Schmitz, Milwaukee, Wis., assignors to Cutler-Hammer, Inc., Milwaukee, Wis., a corporation of Delaware Application November 6, 1946, Serial No. 708,020

3 Claims. (Cl. 318—211)

This invention relates to a method of and means for controlling alternating current motors, and while not limited thereto is especially advantageous in controlling the braking action of such motors when subjected to overhauling loads.

An object of this invention is to obtain through the use of capacitance in conjunction with a motor primary, a means of varying the amount of unbalance of the motor primary to obtain distinctive speed torque characteristics of the motor.

Another object is to provide slow lowering speeds with correspondingly high braking torques for lowering loads of a high overhauling value.

Another object is to provide a slow lowering speed for an empty hoist hook with positive downward torque at zero speed, or alternatively for a heavy load, with a small torque in the hoisting direction at zero speed.

Another object is to provide for control which may be effected through the medium of either electromagnetic means or manual means, as for example a drum controller.

Other objects and advantages of the invention will hereinafter appear.

The accompanying drawings illustrate certain embodiments of the invention which will now be described, it being understood that the embodiment illustrated is susceptible of various modifications without departing from the scope of the appended claims.

In the drawings:

Figure 1 is a diagrammatic showing of a motor under the control of a drum type controller;

Figs. 2 to 6, inclusive, are simplified diagrams of the motor primary connections established by the controller of Fig. 1 for lowering, and Fig. 7 depicts the speed torque characteristics of the motor which are approximated by the control method herein disclosed.

Referring to Fig. 1, the same illustrates diagrammatically a slip ring motor 10 having a primary supplied from lines $L^1$, $L^2$ and $L^3$, the primary having terminals $T^1$, $T^2$, $T^3$. The secondary of the motor has terminals $M^1$, $M^2$ and $M^3$, and for control thereof in a conventional manner series resistors for each phase, shown as resistors $R^{11}$ to $R^{15}$, $R^{21}$ to $R^{25}$, and $R^{31}$ to $R^{35}$. Also as is customary, the motor has associated therewith an electro-mechanical brake B having a shunt winding, said winding having a terminal $B^1$ thereof connected to the motor terminal $T^1$ and having a terminal $B^2$ connected to motor terminal $T^2$.

The connections between the primary of motor 10 and lines $L^1$, $L^2$ and $L^3$ include a triple pole switch 11, preferably of the electromagnetic type, to be controlled in any preferred manner, and a drum controller 12, the latter controlling all connections between the motor and switch 11, except the connection of line $L^2$ to terminal $T^2$ of the primary, line $L^2$ being directly connected to terminal $T^2$ whenever switch 11 is closed.

The drum controller 12 is of the conventional form, comprising two sets of contact segments and an intermediate set of contact fingers. As will be understood, when the segments stand in the relation to the contact fingers depicted in Fig. 1, the drum is in the off position from which it is movable in one direction to engage with certain of the fingers the hoisting segments, or alternatively in a reverse direction to engage with certain of said fingers the lowering segments. The hoisting segments are arranged to accomplish hoisting control in a well known manner, and accordingly this portion of the control will not be described in detail. For simplicity of illustration Fig. 1 shows the circuit connections between the motor and drum in cable form, but the reference characters employed enable all circuits to be readily traced. Each drum finger bears the reference of line, motor, resistor, or capacitor terminal to which it is connected, supplemented by the prefix F. Thus for example, it will be understood that contact finger $FR^1$ has a direct connection to resistor $R^1$—$R^2$, whereas contact finger $FC^2$ has a direct connection to terminal $C^2$ of capacitor $C^1$—$C^2$.

The lowering segments of the drum include the interconnected segments 22 and 23 which engage and bridge contact fingers $FT^3R^2$ and $FC^2$ in the first two lowering positions. A two-part segment 25 has part $a$ which engages contact finger $FT^1C^1$ in the first and an intermediate lowering position, and a part $b$ which engages said contact finger in the third lowering position, part $a$ being interconnected with segment 26 in the first and intermediate positions and part $b$ being interconnected with segment 24. The segment 24 engages its contact finger $FR^3$ in the third lowering position. Segment 26, interconnected with segments 25, 27 and 28, engages contact finger $FL^1$ in all lowering positions. Segment 27 engages finger $FR^1$ in all but the first lowering position. Segment 28 engages finger $FT^3$ in the second to the fifth lowering positions. Interconnected segments 20 and 21 engage fingers $FR^5$ and $FL^3$, respectively, in the fourth and fifth lowering positions, and interconnected segments 29, 30 and 31 engage, respectively, fingers $FR^{12}$, $FR^{22}$ and $FR^{32}$ in all but the fifth lowering position.

The drum contact segment and finger above described, with the exception of segments 29, 30 and 31 and their respective contact fingers, are provided for the control of the motor primary. Control of the motor primary is effected by connecting the capacitor $C^1$—$C^2$ between the supply circuit and primary terminals $T^1$ and $T^3$ selectively, and by effecting other circuit commutation making use of primary resistors $R^1$—$R^2$, $R^2$—$R^3$ and $R^5$—$R^6$. The circuits for the three phases of the primary winding, the capacitors and the resistors above mentioned are shown in simplified form in Figs. 2 to 6, inclusive.

Prior to considering the primary connections it is to be noted that in the first four lowering positions all secondary resistors except $R^{11}$—$R^{12}$, $R^{21}$—$R^{22}$ and $R^{31}$—$R^{32}$ are included in the secondary circuit, the latter resistors being short-circuited by the bridging of contact fingers $FR^{12}$, $FR^{22}$ and $FR^{32}$ by the contact segments 29, 30 and 31. However, the resistors just mentioned are included in the motor secondary circuit in the fifth lowering positions of the drum by disengagement of segments 29, 30 and 31 from their respective fingers.

Referring to Fig. 2, it shows the circuit connections of the motor primary as established in the first lowering position of the drum, assuming that the line switch 11 is closed. Line $L^2$ is directly connected to terminal $T^2$. Terminal $T^1$ is connected to line $L^1$ by the engagement of the contact segments $25^a$ and 26 with their respective fingers. Terminal $T^3$ is connected to line $L^1$, in series with the capacitor $C^1$—$C^2$ by the engagement of contact segments 22 and 23 with their respective fingers, and by the engagement of segments $25^a$ and 26 above mentioned. The described connections of primary phases N—$T^1$ and N—$T^3$ with line $L^1$ and phase N—$T^2$ with line $L^2$ would, without capacitor $C^1$—$C^2$, effect a single phase connection of the motor primary, lines $L^1$ and $L^2$ constituting the single phase power source. Without the capacitor $C^1$—$C^2$ in the circuit between line $L^1$ and the terminal $T^3$ the currents in phases N—$T^1$ and N—$T^3$ would be in phase at zero speed. Because the capacitor $C^1$—$C^2$ is in the connection between line $L^1$ and terminal $T^3$, the current in phase N—$T^3$ tends to lead with respect to that in N—$T^1$. This results in an increased positive sequence component of the unbalanced current system, and consequently results in greater upward or braking torque for a given speed, when the motor is subjected to overhauling loads, as compared to operation without the capacitor. The speed torque characteristics of the motor in the first lowering position are depicted by curve 1L of Fig. 7.

This position affords slow speed lowering of heavy loads. It will also be observed that the motor would tend to hoist an empty hook. However, the internal friction of the hoist mechanism could prevent this from occurring.

Referring to Fig. 3, it depicts the connections of the motor primary in an intermediate position between the first and second lowering positions. These connections are established by the engagement of contact segment 27 with its contact finger while the connections established in the first position are maintained. The engagement of segment 27 with its finger connects the resistor $R^1$—$R^2$ in parallel the capacitor $C^1$—$C^2$ between line $L^1$ and terminal $T^3$. Segment $25^a$ then disengages its contact finger, interrupting the direct connection of terminal $T^1$ with line $L^1$, placing the resistor $R^1$—$R^2$ in series with the capacitor $C^1$—$C^2$ between line $L^1$ and terminal $T^1$. The overlap of segments $25^a$ and 27 in the intermediate position insures a continuous connection of phase N—$T^1$ with the power supply. The resistor $R^1$—$R^2$ in series with the capacitor $C^1$—$C^2$ during the overlap prevents the welding of contact 27 to its contact finger due to the discharge of capacitor $C^1$—$C^2$ during the transition.

Referring to Fig. 4, it shows the connections of the motor primary in the second lowering position. These connections are established by the engagement of contact segment 28 with its contact finger while the other connections remain the same as finally established in the intermediate position. The engagement of segment 28 with its finger connects the terminal $T^3$ directly with line $L^1$, and terminal $T^1$ is connected in series with capacitor $C^1$—$C^2$ to line $L^1$, with the resistor $R^1$—$R^2$ being short-circuited. Connecting the capacitor $C^1$—$C^2$ between line $L^1$ and terminal $T^1$ causes the current in phase N—$T^1$ to lead with respect to that in phase N—$T^3$. This increases the negative sequence component of the unbalanced current system and consequently results in less upward or braking torque for a given speed as compared to operation without the capacitor, or operation with the capacitor connected as in the first lowering position. The speed torque characteristics of the motor for the second lowering position are depicted by curve 2L of Fig. 7. Under overhauling load conditions this provides an increased lowering speed with a positive downward torque at zero speed which is advantageous for driving an empty hook downward.

Referring to Fig. 5, it shows the circuit connections of the motor primary as established in the third lowering position. These connections are established by the engagement of contact segments 24 and 25 with their respective contact fingers and by the disengagement of contact segments 22 and 23 from their fingers. The above mentioned commutations connect terminal $T^1$ in series with the resistor $R^2$—$R^3$ to line $L^1$ and then disconnect the capacitor $C^1$—$C^2$ from the circuit. Terminal $T^3$ remains connected directly to line $L^1$ as established in the second lowering position. It will be noted that there is an overlap between the engagement of segments 24 and $25^b$ with their fingers, and the disengagement of segments 22 and 23 from their fingers. This insures a continuous connection between primary phase N—$T^1$ and line $L^1$ at all times, without resultant loss of torque that would occur if there were a momentary gap in the connection to line $L^1$. The speed torque characteristics of the motor for the third lowering position are depicted by curve 3L of Fig. 7. This shows a further decrease of braking torque for given speeds under overhauling load conditions.

Referring to Fig. 6, it shows the circuit connections of the motor primary in the fourth lowering position. These connections are established by the engagement of contact segments 20 and 21 with their contact fingers and by the disengagement of segments 24 and $25^b$ from their fingers immediately following the engagement of segments 20 and 21. This effects a connection of terminal $T^1$ to line $L^3$ in series with a resistor $R^5$—$R^6$. The overlap of segments 20 and 21 with respect to segments 24 and 25$^b$ insures a continuous power connection between terminal T$^1$ and the supply circuit in the transition of its connections from line L$^1$ to line L$^3$, without loss of torque. The direct connection of terminal T$^3$ to line L$^1$ remains as previously established. The speed torque characteristics of the motor for the fourth lowering position are depicted by the curve 4L of Fig. 7.

The circuit connections of the motor primary for the fifth lowering position remain the same as established for the fourth lowering position, above described. The transition is effected by the inclusion of the resistors R$^{11}$—R$^{12}$, R$^{21}$—R$^{22}$ and R$^{31}$—R$^{32}$ in the motor secondary circuit by the disengagement of contact segments 29, 30 and 31 from their respective fingers. The speed torque characteristics of the motor in the fifth lowering position are depicted by the curve 5L of Fig. 7.

What we claim as new and desire to secure by Letters Patent is:

1. In combination, a polyphase alternating current motor having at least three primary terminals, a polyphase alternating current supply circuit affording a source of single phase power, a connection between said single phase source and one of said motor terminals, a capacitor, interconnections inclusive of said capacitor between the other two of said three motor terminals, selective connections including selecting means between the interconnected motor terminals and said single phase source to provide with the first mentioned connection a closed motor circuit, said selecting means for selection shifting to opposite sides of said capacitor selectively the connection between said interconnected terminals and said single phase source, a resistor, and connections for said resistor controlled by said selecting means for inclusion of said resistor between said single phase source and one side of said capacitor while said selecting means interrupts the connection between the other side of said capacitor and said single phase source.

2. In combination, a polyphase alternating current motor having at least three primary terminals, a polyphase alternating current supply circuit affording a source of single phase power, a connection between said single phase source and one of said motor terminals, a capacitor, interconnections inclusive of said capacitor between the other two of said three motor terminals, selective connections including selecting means between the interconnected motor terminals and said single phase source to provide with the first mentioned connection a closed motor circuit, said selecting means for selection shifting to opposite sides of said capacitor selectively the connection between said interconnected terminals and said single phase source, a resistor, connections for said resistor controlled by said selecting means for inclusion of said resistor between said single phase source and one side of said capacitor while said selecting means interrupts the connection between the other side of said capacitor and said single phase source, and means operatively connected to said selecting means and controlling a shunt for said resistor to shunt said resistor from the power connection made therethrough.

3. In combination, a polyphase alternating current motor having high secondary resistance and at least three primary terminals, a polyphase alternating current supply circuit affording a source of single phase power, a connection between said single phase source and one of said motor terminals, a capacitor, interconnections inclusive of said capacitor between the other two of said three motor terminals, selective connections including selecting means between the interconnected motor terminals and said single phase source to provide with the first mentioned connection a closed motor circuit, said selecting means for selection shifting to opposite sides of said capacitor selectively the connection between said interconnected terminals and said single phase source, a resistor, and connections for said resistor controlled by said selecting means for inclusion of said resistor between said single phase source and one side of said capacitor while said selecting means interrupts the connection between the other side of said capacitor and said single phase source.

EDWIN W. SEEGER.
NORBERT L. SCHMITZ.

REFERENCES CITED

The following references are of record in the file of this patent:

UNITED STATES PATENTS

| Number | Name | Date |
| --- | --- | --- |
| 2,384,864 | Wickerham | Sept. 18, 1945 |
| 2,406,323 | Davis et al. | Aug. 27, 1946 |
| 2,420,192 | Rathbun | May 6, 1947 |

FOREIGN PATENTS

| Number | Country | Date |
| --- | --- | --- |
| 299,886 | Great Britain | Oct. 31, 1929 |
| 570,284 | Germany | Feb. 14, 1933 |
| 212,698 | Switzerland | Mar. 3, 1941 |